(12) United States Patent
Nerguizian et al.

(10) Patent No.: US 7,630,943 B2
(45) Date of Patent: Dec. 8, 2009

(54) METHOD AND SYSTEM FOR INDOOR GEOLOCATION USING AN IMPULSE RESPONSE FINGERPRINTING TECHNIQUE

(75) Inventors: Chahè Nerguizian, Montreal (CA); Charles Despins, L'Orignal (CA); Sofiène Affes, Montreal (CA)

(73) Assignee: Institut National de la Recherche Scientifique (INRS) (CA)

( * ) Notice: Subject to any disclaimer, the term of this patent is extended or adjusted under 35 U.S.C. 154(b) by 588 days.

(21) Appl. No.: 11/389,882

(22) Filed: Mar. 27, 2006

(65) Prior Publication Data
US 2007/0010956 A1    Jan. 11, 2007

Related U.S. Application Data

(63) Continuation of application No. PCT/CA2004/001745, filed on Sep. 24, 2004.

(60) Provisional application No. 60/505,753, filed on Sep. 26, 2003.

(51) Int. Cl.
*G06N 5/00* (2006.01)

(52) U.S. Cl. .................. 706/20; 706/45; 375/349; 375/350; 375/317; 375/347

(58) Field of Classification Search .................. 706/20; 375/349, 350, 317, 347
See application file for complete search history.

(56) References Cited

U.S. PATENT DOCUMENTS 5,564,079 A    10/1996    Olsson

OTHER PUBLICATIONS

Battiti, R., et al., "Neural Network Models for Intelligent Networks: Deriving the Location From Signal Patterns", *Proceedings, First Annual Symposium on Autonomous Intelligent Networks and Systems*, (UCLA, Los Angeles, May 8-9, 2002),(2002), 13 pgs.

Liu, J., "Improving Strength-of-Arrival Position Location Using a Neural Network on Radio Channel Impulse Responses", *Thesis, Master of Science in Engineering*, Department of Electrical and Computer Engineering, The University of New Brunswick,(Sep. 2002), 160 pgs.

Nerguizian, C., et al., "A Framework for Indoor Geolocation Using an Intelligent System", *Third IEEE Workshop on Wireless LANs, Technical Sessions S6*, (2001), 38 pgs.

Pahlavan, K., et al., "Indoor Geolocation Science and Technology", *IEEE Communications Magazine*, 40(2), (Feb. 2002), 112-118.

*Primary Examiner*—Wilbert L Starks, Jr.
(74) *Attorney, Agent, or Firm*—Schwegman, Lundberg & Woessner, P.A.

(57) ABSTRACT

A system and method for predicting the location of a transmitter in an indoor zone of interest, including fixed receiver for receiving a signal from the transmitter, the receiver deriving a fingerprint from the received signal, and a trained neural network. The trained neural network predicts the transmitter location from the fingerprint. The method includes receiving a signal transmitted from the transmitter at a fixed-location receiver, deriving a fingerprint from the received signal, supplying the fingerprint to a trained neural network, and reading the predicted location from the neural network. The artificial neural network may further be trained and include a plurality of weights and biases is also shown. The method may include collecting a training data set of fingerprints and corresponding locations, inputting the training data set to the neural network, and adjusting the weights and biases by minimizing a sum of squares error function.

55 Claims, 9 Drawing Sheets

METHOD AND SYSTEM FOR INDOOR GEOLOCATION USING AN IMPULSE RESPONSE FINGERPRINTING TECHNIQUE

RELATED APPLICATIONS

This application is a continuation under 35 U.S.C. 111(a) of PCT/CA2004/001745, filed Sep. 24, 2004 and published as WO 2005/032189 A1, filed Apr. 7, 2005, which claimed priority under 35 U.S.C. 119(e) to U.S. Provisional Patent Application No. 60/505,753, filed Sep. 26, 2003, which applications and publication are incorporated herein by reference and made a part hereof.

FIELD OF THE INVENTION

The present invention relates to a method and system for indoor geolocation using an impulse response fingerprinting technique. In particular, the present invention relates to a method and system for locating a mobile station using a fingerprinting technique based on wideband channel measurements results in conjunction with a neural network as well as a method for training the neural network.

BACKGROUND OF THE INVENTION

One problem of growing importance in indoor environments is the location of people, mobile terminals and equipment. Indoor radio channels suffer from extremely serious multipath and non-line of sight (NLOS) conditions that have to be modeled and analysed to enable the design of radio equipment for geolocation applications. Since telecommunication and geolocation applications have different objectives, existing radio channel models developed for telecommunications are not appropriate, and different models and techniques have had to be developed to provide adequate and accurate localisation.

The prior art reveals wireless geolocation applications where the location system gathers parametric information, for example the received signal strengths (RSS), angles of arrival (AOA), times of arrival (TOA) or time differences of arrival (TDOA) and processes this information to form a location estimate. In indoor environments where signal propagation is very complex, these existing parametric geolocation techniques (and combinations thereof) provide only limited location accuracy, as they depend largely on Line of Sight (LOS) to ensure accuracy, an element which of course is largely not present in indoor environments. The major errors in measurement are introduced during the extraction of the location dependent metrics, and are due primarily to the indoor environment. As a result, the lines of position (LOP) do not intersect due to these errors, thereby resulting in large estimation errors. Additionally, multiple measurements are invariably needed in order to obtain a two-dimensional position.

Geolocation based on a received signals' fingerprint have proven more accurate at determining location in indoor environments. Due to interference introduced by natural or man-made objects, which tend to cause a transmitted signal to break up into a number of different paths, each transmitted signal has a unique signature, or fingerprint, by the time it reaches a given receiver dependant on the location of the transmitter and the receiver.

The process of geolocation based on the received signals' fingerprint is composed of two phases, a phase of data collection (off-line phase) and a phase of locating a user in real-time (real-time phase).

The first phase consists of recording a set of fingerprints as a function of the user's location, covering the entire zone of interest. During the second phase, a fingerprint is measured by a receiver and compared with the recorded fingerprints of the database. A pattern matching algorithm (positioning algorithm) is then used to identify the closest recorded fingerprint to the measured one and hence to infer the corresponding user's location.

To constitute a "signature" pattern or a fingerprint, several types of information can be used such as, received signal strength (RSS), received angular power profile (APP) and received power delay profile (PDP) or channel impulse response (CIR).

On the other hand, several types of pattern-matching algorithms may be used in the fingerprinting technique, which have the objective to give the position of the mobile station with the lowest location error. The most popular algorithms are based on the:
  nearest neighbour(s) in signal space (location estimate defined as the lowest Euclidean, Box-Cox or statistical metric in signal space); or
  cross-correlation between signal vectors (location estimate defined as the highest correlation coefficient between signal vectors).

It has to be noted that the accuracy of the method is primarily a function of the reproducibility and uniqueness of the estimated set of fingerprint information. Reproducibility means the achievement of almost the same estimated set of fingerprint information in one location for different observation times. Uniqueness means that the set of fingerprint information in one location is relatively different from the one in another location (no aliasing in the signature patterns).

Several geolocation systems, using fingerprinting techniques, have been deployed in both indoor and outdoor environments. The main differences between these systems are the types of fingerprint information and the types of pattern matching algorithms.

RADAR™, is an RF network-based system for locating and tracking users inside buildings and uses RSS (narrowband measurements) fingerprint information gathered at multiple receiver locations to determine the user's co-ordinates. The system, operating with WLAN technology, has a minimum of three access points (fixed stations) and covers the entire zone of interest.

The pattern-matching positioning algorithm consists of the nearest neighbour(s) in signal space. The minimum Euclidean distance (in signal space), between the observed RSS measurements and the recorded set of RSS measurements, computed at a fixed set of locations, gives the estimated user's location.

DCM™, is an RF handset-based system for locating and tracking users in a metropolitan outdoor environment. The mobile terminal that needs to be located performs measurements of signal strength (narrowband measurements) received from the serving cell and six strongest neighbours. The gathered information is then sent to a location server, where the location of the user is estimated and this estimate is sent back to the application server. Other types of signal information (cell ID, propagation time delay) can also be used within the network. The system, operating with the GSM Cellular technology, has several fixed stations and covers the entire zone of interest.

A simple correlation algorithm is used to estimate the user's location. A best match search, between the observed RSS measurements by the mobile station and the recorded set of RSS measurements in the location server, is computed at a fixed set of locations and the MS's location is estimated.

It has to be noted that, since DCM™ is a handset-based location system, its implementation involves some software modifications of the mobile terminal in order to enable the retrieval of received signal characteristics.

In the framework of the WILMA project, RSS fingerprinting techniques are used to locate users in a building with a WLAN infrastructure. The pattern-matching algorithm involved is an artificial neural network, which consists of a multi-layer perceptron (MLP) architecture with 3, 8 and 2 neurones in the input, hidden and output layers respectively to achieve the generalisation needed when confronted with new data, not present in the training set.

RadioCamera™ is an RF network-based system for locating and tracking users in a metropolitan outdoor environment. It uses multipath angular power profile (APP) information gathered at one receiver to locate the user's coordinates. The system, operating with cellular technology, has one-antenna array per cell (fixed station) and covers the entire zone of interest. The pattern-matching algorithm, used to estimate the user's location, consists of the nearest neighbour(s) in signal space. The minimum statistical (Kullback-Liebler) distance (in signal space), between the observed APP measurements and the recorded set of APP measurements, computed at a fixed set of locations, gives the estimated user's location (see, for example, U.S. Pat. No. 6,112,095 for Signature Matching for Location Determination in Wireless Communication Systems which is incorporated herein by reference).

DCM™, operating with UMTS technology and using CIR as fingerprint information, is the second RF handset-based system for locating and tracking users in a metropolitan outdoor environment. It has several fixed stations and covers the entire zone of interest. To form the database, a set of fingerprints is modeled by computing the radio channel impulse responses (CIR) with a ray-tracing tool. The magnitudes of these impulse responses or the power delay profiles (PDP) are calculated (after setting a threshold value in order to reduce contributions of noise power and interference from other codes) from each fixed station to each receiving point corresponding to the user's location. The mobile terminal that needs to be located performs measurements of channel's impulse responses (wideband measurements).

The magnitude of the impulse response from the strongest fixed station is correlated with the content of its database (pattern-matching algorithm) at the location server. The receiving point with the highest correlation coefficient is taken to represent the co-ordinates of the mobile station.

Measured channel impulse responses are used for database collection and for location estimation algorithm. The system performs an outdoor geolocation using GSM and UMTS technologies.

The pattern-matching algorithm involved is based on the nearest neighbour in signal space. The minimum Box-Cox distance between the observed CIR measurements and the CIR measurements contained in the database gives the estimated user's location.

The accuracy and coverage of the geolocation systems, using the fingerprinting technique, depend on the resolution and the size of the database. Calibration measurement and database maintenance are essential in the operation of these systems. Moreover, the search methodology, involved in the pattern-matching algorithm should be efficient to minimise the time needed for the localisation.

Systems, using RSS fingerprinting technique (RADAR™ and WILMA for indoor, DCM™ for outdoor), require the involvement of several fixed stations to compute the user's location. Moreover, RSS yield a great amount of variation for a small location deviation implying a reproducibility concern, which may degrade the location accuracy.

The system, using APP fingerprinting technique, requires the use of an antenna array with high angular resolution for indoor geolocation since the scatterers are around both the transmitter and the receiver.

Systems, using CIR or PDP fingerprinting technique, have the advantage of being reproducible and respecting the uniqueness property, especially when the localisation is done on a continuous basis (user's tracking).

A signature based on the impulse response of the channel appears to give the best location accuracy for an indoor geolocation. However, its implantation involves the use of a wideband receiver.

On the other hand, the pattern-matching algorithm used in RADAR™, DCM™ and RadioCamera™ systems may show a lack of generalization (an algorithm that gives an incorrect output for an unseen input), a lack of robustness against noise and interference, a lack of pattern match in some situations (i.e. the Euclidean distance can be minimized without having the match of the two patterns) and a long search time needed for the localization (done during the real-time phase) especially when the size of the environment or the database is large. Hence, the use of an artificial neural network (ANN), as the pattern-matching or positioning algorithm, is essential to the enhancement of the geolocation system.

As a measure of performance, the median resolution of the location estimation for indoor and outdoor geolocation systems, using fingerprinting techniques, is reported to be in the range of 2 to 3 meters and 20 to 150 meters respectively.

SUMMARY OF THE INVENTION

The present invention addresses the above and other drawbacks of the prior art by providing a system for predicting the location of a transmitter located in an indoor zone of interest. The system comprises a fixed receiver for receiving a signal from the transmitter, the receiver deriving a fingerprint from the received signal, and a trained neural network. The trained neural network predicts the transmitter location from the fingerprint.

There is also provided a method for training an artificial neural network for predicting a location of a transmitter in an indoor zone of interest where the network is comprised of a plurality of weights and biases. The method comprises the steps of collecting a training data set comprising a plurality of fingerprints and corresponding locations inputting the training data set to the neural network, and adjusting the weights and the biases by minimising a sum of squares error function $$E_D = \frac{1}{N} \sum_{i=1}^{N} (t_i - a_i)^2$$

where $t_i$ is a corresponding location of an $i^{th}$ entry of the training data set of fingerprints and $a_i$ is the neural network's predicted transmitter location to the $i^{th}$ entry of the training data set fingerprints. The collecting step comprises the steps of a) placing a test transmitter at a new location within the zone of interest, b) transmitting a signal from the test transmitter to a receiver, c) extracting a fingerprint from the received signal, d) associating the fingerprint with the new location and e) repeating steps a), b), c) and d) throughout the zone of interest n times.

Additionally, there is disclosed a method for predicting the location of a transmitter in an indoor zone of interest. The method comprises the steps of providing a receiver having a fixed location, receiving a signal transmitted from the transmitter at the receiver, deriving a fingerprint from the received signal, supplying the fingerprint to an input of a trained neural network and reading the predicted location from an output of the neural network.

DETAILED DESCRIPTION OF THE ILLUSTRATIVE EMBODIMENTS

Figure 1:
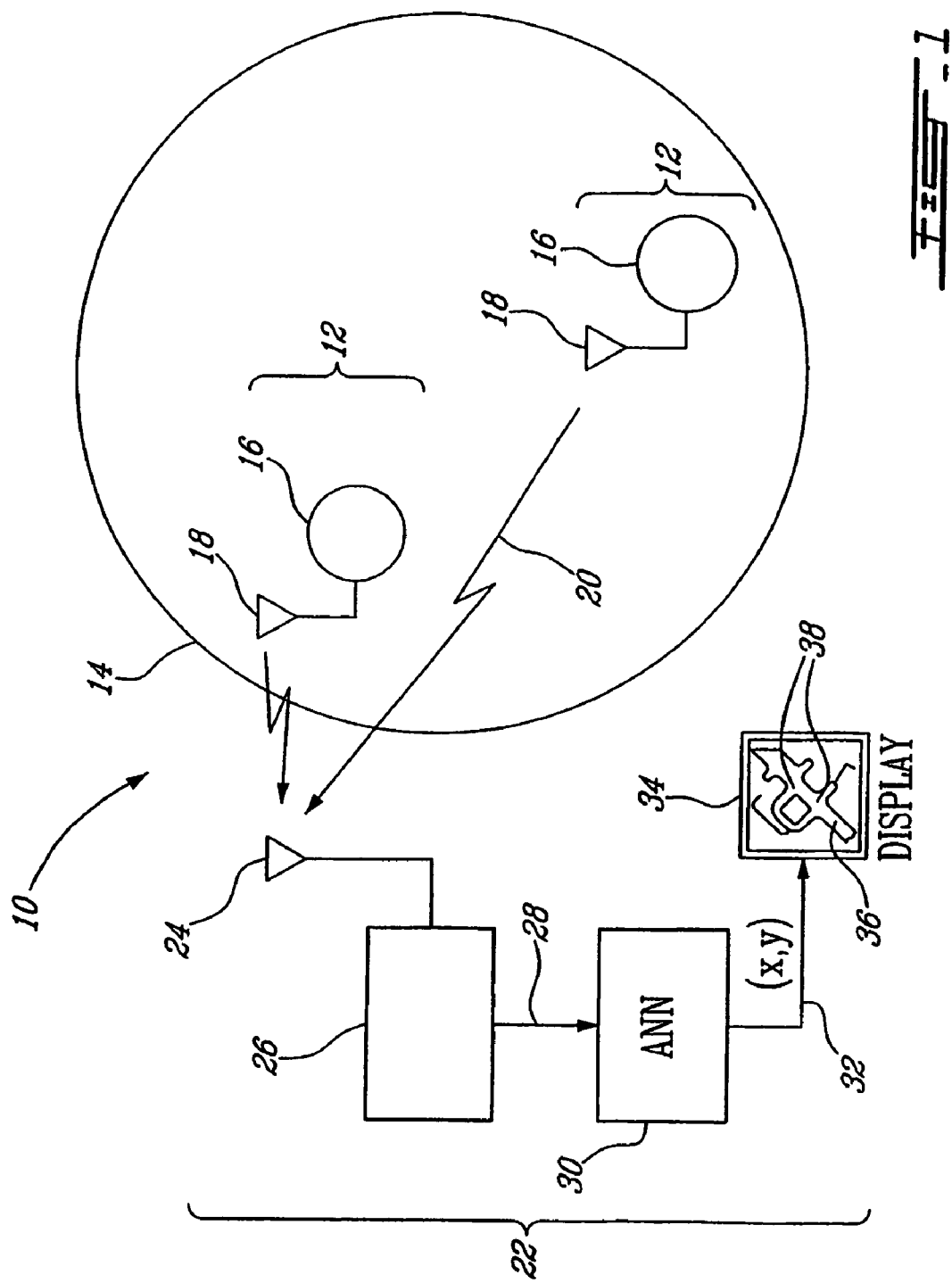
FIG. 1 is a schematic diagram of a geolocation system in accordance with an illustrative embodiment of the present invention.

Referring now to FIG. 1, a geolocation system, generally referred to using the reference numeral 10, in accordance with an illustrative embodiment of the present invention will now be described. The geolocation system 10 consists of at least one mobile transmitter as in 12 located in a zone of interest 14. The zone of interest 14 is illustratively an underground gallery of a mineshaft comprised of a series of interconnected tunnels (not shown) and within which the mobile transmitters 12 are free to move, although other environments, such as hospitals, shopping malls, campuses and the like, could also provide suitable zones of interest.

The mobile transmitters 12 broadcast channel sounding signals generated by a radio frequency (RF) synthesizer 16 which are transmitted via an antenna 18 and a wireless RF channel 20 to a fixed receiver 22. The fixed receiver 22 comprises an antenna 24, a network analyser 26 for deriving the complex impulse response of the channel 20 from the received channel sounding signals and subsequently generating fingerprint information 28, illustratively the 7 parameters as discussed herein below, from the complex impulse response, an artificial neural network 30 for determining the mobile transmitter's 12 location coordinates 32 based on the fingerprint information 28, and a display device 34 comprising, for example, a digital rendering 36 of the zone of interest on which representative icons 38 of the mobile transmitter's 12 location are superimposed.

Illustratively, the frequency domain channel sounding has been taken advantage of as a basis for deriving the complex impulse response, and thus the fingerprint information 28, of the channel 20. In frequency domain channel sounding, the RF synthesizer 16 of the mobile transmitter 12 is controlled to emit discrete frequencies at a known power which make up the band of frequencies of the channel 20. The analyser 26 monitors these channel sounding signals and derives the fingerprint information 28 there from. Of note, however, is that frequency domain channel sounding requires both the transmitter and receiver to be under common control, for example by a vector network analyser (not shown). The vector network analyser transmits a known signal level via a known frequency via a first port and monitors the received signal level at a second port. The signal levels allow the analyzer to determine the complex frequency response of the channel over the measured frequency range. This is, of course, generally impractical for implementation in an actual mobile system, but as will be seen below provides a useful basis for collecting training data sets and for testing purposes. In an actual implementation other channel sounding techniques, for example Direct RF Pulse (UWB) channel sounding (where a pulse having a width=2/the channel bandwidth is transmitted repeatedly at intervals greater than the maximum delay of the multipath signal, typically about 500 ns for an indoor signal), Spread Spectrum Sliding Correlator channel sounding or a modified WiFi system could be used.

A quasi-static mobile radio channel may be characterized by its impulse response, i.e. the signal one would receive if the transmitted signal was a single impulse (delta-pulse or Dirac's delta function) with infinitesimal temporal extension and unlimited energy. Given multipath propagation the receiver detects a sequence of these pulses. Their amplitude depends on two parameters:

the length of the propagation path (due to wave attenuation in free space the signals will become weaker with propagation length and time); and the manner in which the multipath components interfere at the receiver (depending on the path length and the frequency of the signal, the multipath signals interfere either constructively or destructively due to differing phase values).

Consequently, the wireless channel may be modeled as a linear time invariant filter with a varying impulse response where the variation is due to the transmitter's and receiver's positions in space. The filtering nature of the channel is caused by the combination of amplitudes and delays of the multiple arriving signals at the receiver, which gives rise fluctuations in signal strength, thereby inducing small scale fading, signal distortion, or both. As a result, the impulse response may be used to characterize the channel between a given transmitter and receiver pair. As the location of the receiver is fixed, and assuming the presence of reflecting objects and scatters which are giving rise to the multipath nature of the received signal remain constant, the impulse response varies only with the position of the transmitter, with the impulse response for transmitters at different locations being unique. Therefore, by associating given impulse responses with particular position coordinates, a given impulse response (or filter characteristic) may be used to provide an indication of the location of the transmitter.

As is known in the art, in order to simplify the extraction of the impulse response from a signal received at the receiver, it is useful to divide the multipath delay axis τ of the impulse response into equal time delay segments called "excess delay bins", where each bin has a time delay width $\Delta\tau$ equal to $\tau_{i+1}-\tau_i$ where $\tau_0=0$ (known as the Discrete Time Impulse Response Model). Any number of multipath signals received within the $i^{th}$ bin are represented by a single resolvable multipath component having delay $\tau_i$. To each multipath component an amplitude and phase value may also be assigned. The chosen bin size must be small enough to provide adequate resolution, and a value of $\Delta\tau$ such that the bandwidth=½$\Delta\tau$ has proven adequate. Additionally, the number of bins must be chosen such that the probability that a multipath component does not fall within one of the bins is negligible. For example, for a wide band signal of 100 MHz bandwidth, as in indoor environments the maximum delay very rarely exceeds 500 ns and the probability of receiving longer delayed components negligible, a bin size $\Delta\tau$ of 5 nanoseconds with 100 bins would provide adequate resolution and maximum delay.

Figure 2:
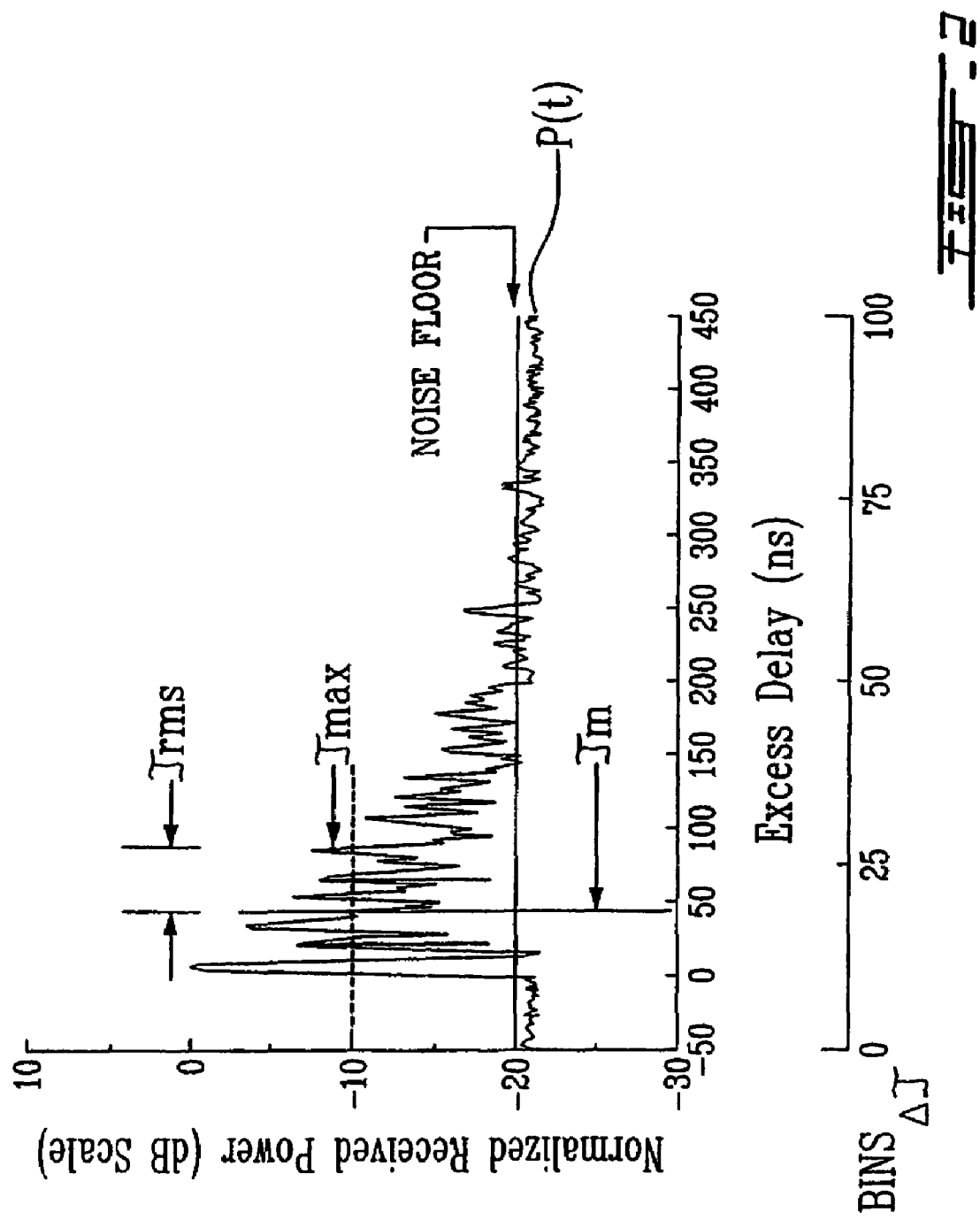
FIG. 2 is a graph illustrating an indoor Power Delay Profile (PDP) illustrating the parameters of a channel impulse response including mean excess delay $\tau_m$, rms delay spread $\tau_{rms}$ and maximum excess delay spread $\tau_{max}$ (10 dB)

The excess delay $\tau_i$ is the relative delay of the $i^{th}$ multipath component as compared to the first arriving component $\tau_0$. Referring to FIG. 2, in order to quantify different multipath channels, time dispersion parameters such as the mean excess delay $\tau_m$, the rms delay spread $\tau_{rms}$ and the excess delay spread $\tau_{max}$ are derived from the Power Delay Profile (PDP) P(t) of the transmitted signal. If the transmitted signal is able to resolve the multipaths, then the received power is simply the sum of the powers in each multipath component $\tau_i$ above a predetermined multipath noise floor. The powers of each multipath component can be derived from the received amplitude, and as a result, the PDP is readily derived from these amplitudes.

The mean excess delay $\tau_m$ is the first moment of P(t), the rms delay spread $\tau_{rms}$ is the square root of the second central moment of P(t), while the maximum excess delay $\tau_{max}$ is determined as the time delay from $\tau_0$ during which the energy of the received signal falls a predetermined amount (in dB) below the maximum. Additionally, the number of multipath components N is determined, as well as the total received power P, the power of the first path $P_1$ and the delay of the first path $\tau_1$. The parameters $\tau_m$, $\tau_{rms}$, and $\tau_{max}$ characterize the time spread nature of the channel and the parameters $P_1$ and $\tau_1$ provide information vis-á-vis line of sight (LOS) and non-line of sight (NLOS) situations. Collectively these parameters are used to quantify the impulse response of the channel and, referring back to FIG. 1, make up the fingerprint information 28 which is relayed from the analyzer 26 to the ANN 30.

The pattern matching algorithm to be performed by the geolocation system and method can be characterised as a function approximation problem consisting of a non-linear mapping from a set of input variables, illustratively $\tau_m$, $\tau_{rms}$, $\tau_{max}$, N, P, $P_1$ and $\tau_1$, onto output variables representing the location of the mobile transmitter 12 in space. Illustratively, the location is Cartesian in two dimensions (x, y), although providing a location in three dimensions or other types of coordinates (polar, latitude and longitude, etc.) would also be possible. In order to approximate the non-linear mappings to an arbitrary degree of precision, the ANN 30 is illustratively a feed forward neural network of the Multi Layer Perceptron (MLP) type, although other kinds of networks, such as the Radial Basis Function (RBF) type, may also be implemented. As will be seen below, a learning algorithm is associated with the ANN which trains the network by adjusting the internal weights and biases of the neural network based on minimisation of an error function.

Figure 3:
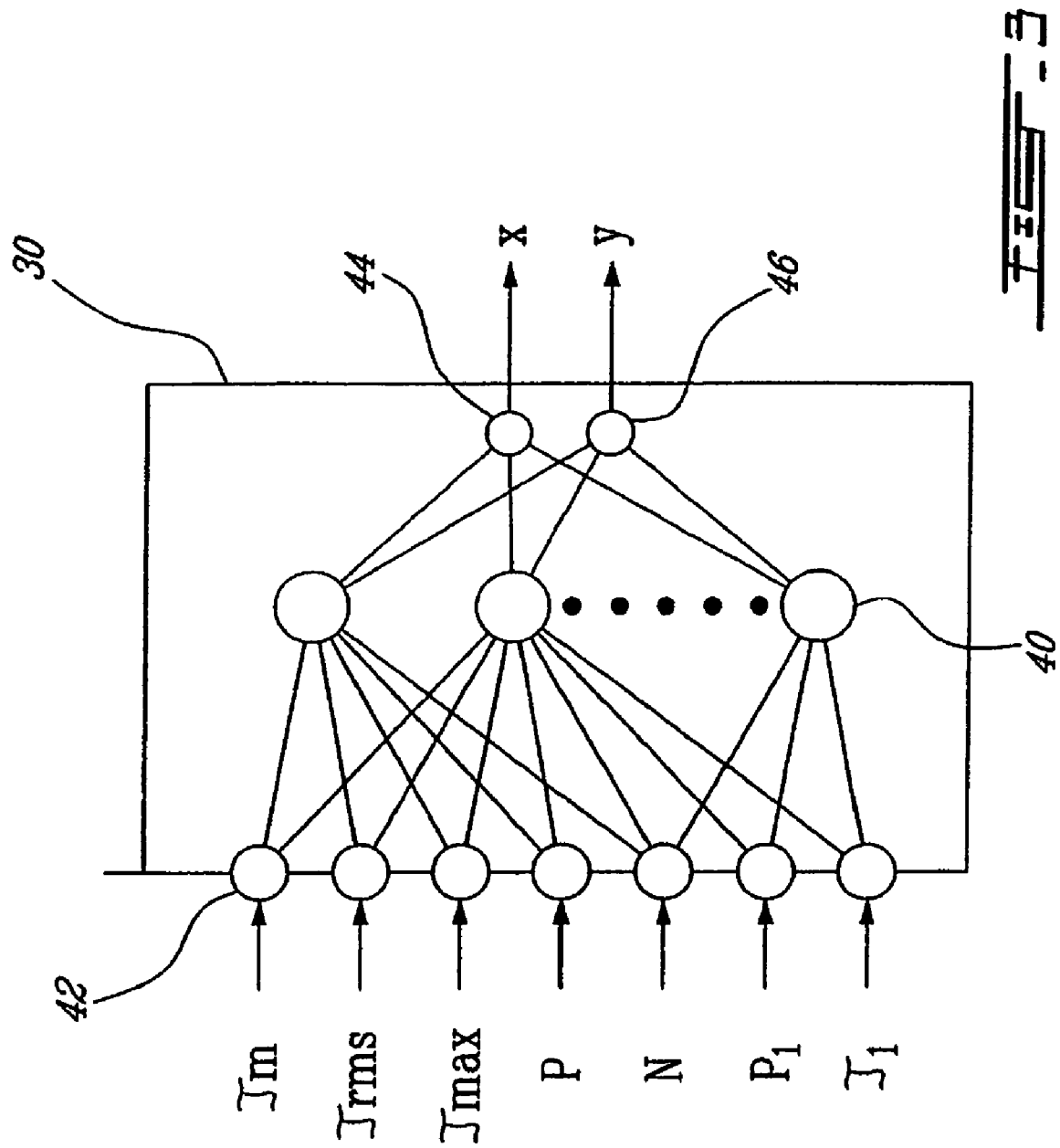
FIG. 3 is a schematic diagram of a neural network in accordance with an illustrative embodiment of the present invention.

Referring to FIG. 3, the ANN 30 is comprised of a plurality of neurons as in 40 in one or more hidden layers. A weight and bias are associated with each neuron 40. Neural networks offer a framework for representing non-linear mappings from several input variables to several output variables, where the form of the mapping is governed by a number of adjustable parameters. The process for determining the values for these parameters on the basis of a data set is called learning or training. As a result, this data set is typically referred to as the training set.

The impulse response quantization parameters as in $\tau_m$, $\tau_{rms}$, $\tau_{max}$, N, P, $P_1$, and $\tau_1$ are fed into the ANN 30 via a series of input neurons as in 42 with the coordinates (x,y) subsequently appearing at the output neurons 44, 46.

As stated above, both Multi Layer Perceptron (MLP) and Radial Basis Function (RBF) type neural networks were examined. Both of these networks can approximate any non-linear mapping to an arbitrary degree of precision provided the network is of the correct complexity. A specific learning algorithm is associated for each of these two networks, and has the role of adjusting the internal weights and biases of the network based on the minimization of an error function.

The MLP network provides global access to any non-linear continuous function due to the sigmoid basis functions present in the network, which are nonzero over an infinitely large region of the input space. Accordingly, they are capable of providing generalisation in regions where no training data was available. RBF networks, on the other hand, have access to a given non-linear continuous function only locally because the basis functions involved cover only small, localised regions. However, the design of an RBF network is typically easier, and the learning is faster, as compared with a MLP network.

Both a generalised regression neural network (GRNN), which is a RBF type network with a slightly different output layer, and a MLP type network have been tested for the illustrative embodiment of the present invention. The MLP network showed a higher location error, compared to the GRNN, during the learning of the training set. However, it showed a lower location error during the generalisation phase of the network. Since the generalisation property of the system was of greater importance in the particular illustrative embodiment, the MLP type network has been chosen as the pattern-matching algorithm for the illustrative embodiment of the present invention.

Development of the ANN 30 for use in the illustrative embodiment of the present invention consisted of two phases, a supervised learning phase and a real time functional phase. During the learning phase, the ANN was trained to form a set of fingerprints as a function of user's location and acted as a function approximator (non-linear regression). A training set of fingerprints, comprising $\tau_m$, $\tau_{rms}$, $\tau_{max}$, N, P, $P_1$ and $\tau_1$ were applied to the input neurons 42 of the ANN 30 and the output neurons 44, 46 compared to the measured location.

The goal of ANN training is not to learn an exact representation of the training data but rather to build a model of the process which generated the training data. This is important if the ANN is to exhibit good generalisation, i.e. the ability to accurately predict outputs for new inputs. In this regard, a good model is flexible enough to adapt to new inputs but not so flexible that too much of the noise on the training data is fitted.

In order to examine the complexity and its effects the generalisation error can be decomposed into the sum of the bias squared plus the variance. A model which is too simple, or too inflexible, will have a large bias, while one which has too much flexibility in relation to the particular data set will have a large variance. The best generalisation is obtained when the best compromise between small bias and small variance is obtained.

In order to find the optimum balance between bias and variance the effective complexity of the model must be controlled. In a neural network the complexity, and therefore the flexibility, of the model can be varied by changing the number of adaptive parameters in the network and through regularisation.

When the size of an ANN is increased, the number of the internal parameters (and weights and biases) increases inducing more local and global minima in the error surface, and making the finding of a global or a nearly global minimum, using a local minimisation algorithm, easier. However, when the size of the ANN is large or equivalently, when the number of the weights and biases is large for the selected training set, an over-fitting problem occurs. This means that although the error on the training set is driven to a very small value, when new data is presented to the network the error is typically large. This is a case where the network has memorised (for example, using a look up table) the training set, but it has not learned to generalise to new situations.

In light of the above, in order to provide the ANN 30 with a sufficiently good generalisation property, the size of the network must be chosen just large enough to provide an adequate fit (known as structural stabilisation). A variety of methods are available for this including, for example, by sampling a range of models having different numbers of hidden units, by starting with a relatively large network and removing the least significant connections (either by removing weights or units), or, alternatively by starting with a relatively small network and adding units. As will be seen below, in the illustrative embodiment, initially the number of hidden layer neurons 40 was chosen to be slightly higher than the number of inputs (in the illustrative embodiment seven (7)). Additionally, the total number of weights and biases was selected to be at least ¼ of the training set of data.

The weights can be optimised through the minimisation of a suitable error function, of which many possible choices can be considered. However, for regression problems, in which the outputs represent the values of continuous variables, the basic goal is to model the conditional distribution of output variables conditioned on the input variables. As such a sum-of-squares error function may be used.

It is assumed that the input variables $x_i$ and the output variables $t_i$ are inter-related by the unknown function $t_i = h(x_i) + e_i$ where $e_i$ is independent Gaussian noise. The initial objective of the training process using the sum of squared errors is, using the training set of input variables $x_i$ and target variables $t_i$, to minimize the sum of squared errors $E_D$, where:

$$E_D = \frac{1}{n}\sum_{i=1}^{n}(t_i - a_i)^2 = mse \qquad (1)$$

where $a_i$ is the response of the neural network to the input variables $x_i$.

In order to improve the generalisation properties of the ANN a regularisation method may be used. In the case at hand, regularisation involves modifying the sum of the squares of the network errors on the training set by adding a term that consists of the mean of the sum of squares of the ANN's weights and biases:

$$msereg = \gamma \cdot mse + (1-\gamma) \cdot msw \qquad (2)$$

where $\gamma$ is the performance ratio. Using this function will cause the ANN to have smaller weights and biases, and as a result the ANN response will be smoother and less likely to over fit. This regularisation can be automated (i.e. the determination of optimal regularisation parameters in an automated fashion), for example by applying Bayesian regularisation in combination with the Levenberg-Marquardt algorithm.

Training aims to reduce the sum of squared errors $F = E_D$. However, regularisation adds an additional term $E_W$ such that $F = \beta E_D + \alpha E_W$, where $E_W$ is the sum of squares of the network weights. Hyperparameters $\alpha$ and $\beta$ dictate the emphasis for the training as values of these hyperparameters which give the best fit for training data typically present overly complex or overly flexible models which do not give the best generalisation. In this regard, if $\alpha << \beta$, then errors will be smaller and accuracy vis-á-vis the training set will typically be improved. However, if $\alpha >> \beta$, then a smoother network response will typically result, and generalisation to input variables not used in the training set will be improved. As a result, regularisation involves optimising the hyperparameters $\alpha$ and $\beta$. One illustrative method of optimising the hyperparameters $\alpha$ and $\beta$ is according to the following:

1. Initialise $\alpha=0$ and $\beta=1$ and initialise the weights using, for example, the Nguyen-Widrow method;
2. take one step of the Levenberg-Marquardt algorithm to minimise the function $F(w) = \beta E_D + \alpha E_W$;
3. compute the effective number of parameters $\gamma = N - 2\alpha \text{tr}(H)^{-1}$ making use of the Gauss-Newton approximation to the Hessian provided in the Levenberg-Marquardt training algorithm where $H = \nabla^2 F(w) \approx 2\beta J^T J + 2\alpha I_N$ and where J is the Jacobian matrix of the training set of errors;
4. compute new estimates for the objective function parameters $$\alpha = \frac{\gamma}{2E_W(w)} \text{ and } \beta = \frac{n-\gamma}{2E_D(w)};$$

and
5. reiterate steps 2 through 4 until the objective function does not change significantly between subsequent iterations (convergence).

Given the improved generalisation, properly trained MLP networks tend to give reasonable answers when presented with new inputs that they have never seen. Typically, a new input will lead to an output similar to the correct output (target) for input vectors used in training that are similar to the new input being presented, and as a result there is no need to train the network on all possible input/output pairs.

The MLP architecture used consisted of seven (7) input neurons 42 corresponding to the channel's relevant parameters $\tau_m$, $\tau_{rms}$, $\tau_{max}$, N, P, $P_1$ and $\tau_1$, one hidden layer of ten (10) neurons and an output layer with two (2) neurons 44, 46 corresponding to (x, y) location of the user. A differentiable tan-sigmoid type of transfer function was associated with those hidden layer neurons 40 and a linear one for the output neurons 44, 46. The ten (10) neurons 40 corresponding to the hidden layer were selected for performing the required regression. Special attention was paid to the problem of over-fitting in order to preserve the ability of the neural network to generalise through application of Bayesian regularisation and the Levenberg-Marquardt algorithm as discussed hereinabove. Hence, the resultant neural network was robust to perturbations at its input, i.e. errors in the measurement data, and was able to generalise rather than function based purely on memorisation. Additionally, MLP has an inherent low pass filter property, and typically removes portions of the high frequency components present in the location error signal.

As discussed above, given seven (7) inputs, two (2) output neurons and ten (10) hidden neurons, the total adjustable number of weights and biases is equal to 102, [7*10]+[10*2] for the weights, and [10]+[2] for the biases. This is almost four times smaller than the total number of entries in the training set, which is equal to 367 and corresponds to the 75% of the measured wideband data. As a rule of thumb, to have a good generalisation property and to avoid simple memorisation of the network, the number of entries in the training set should be around four (4) times the number of the internal adjustable ANN parameters. Hence the use of ten (10) hidden layer neurons 40 was believed warranted.

It should be noted that, before training, the inputs and the targets have been preprocessed such that they are normalised. As a result the outputs of the trained network, having scaled inputs and targets, also fall into the range of [−1, +1]. To convert these outputs back into the same units, which were used for the original targets, the amount by which the preprocessed inputs and targets were normalised must be factored into the outputs (denormalised). The normalisation of the inputs and targets improves the performance of the ANN optimisation process.

Due to correlation between input parameters, data sets often contain redundant information. As a result, the dimension of the input vectors can be reduced by transforming the full set of training examples into a compressed set that contains only essential information. In this regard, Principal Component Analysis (PCA) was performed on the input data sets thereby: rendering orthogonal the components of the input vectors (the vectors become uncorrelated with each other); ordering the resulting orthogonal components (principal components) so that those with the largest variation come first, and eliminating those components which contribute the least to the variation in the data set. In the case at hand, those components which introduced less than 0.001 variation in the data set were removed.

Figure 4:
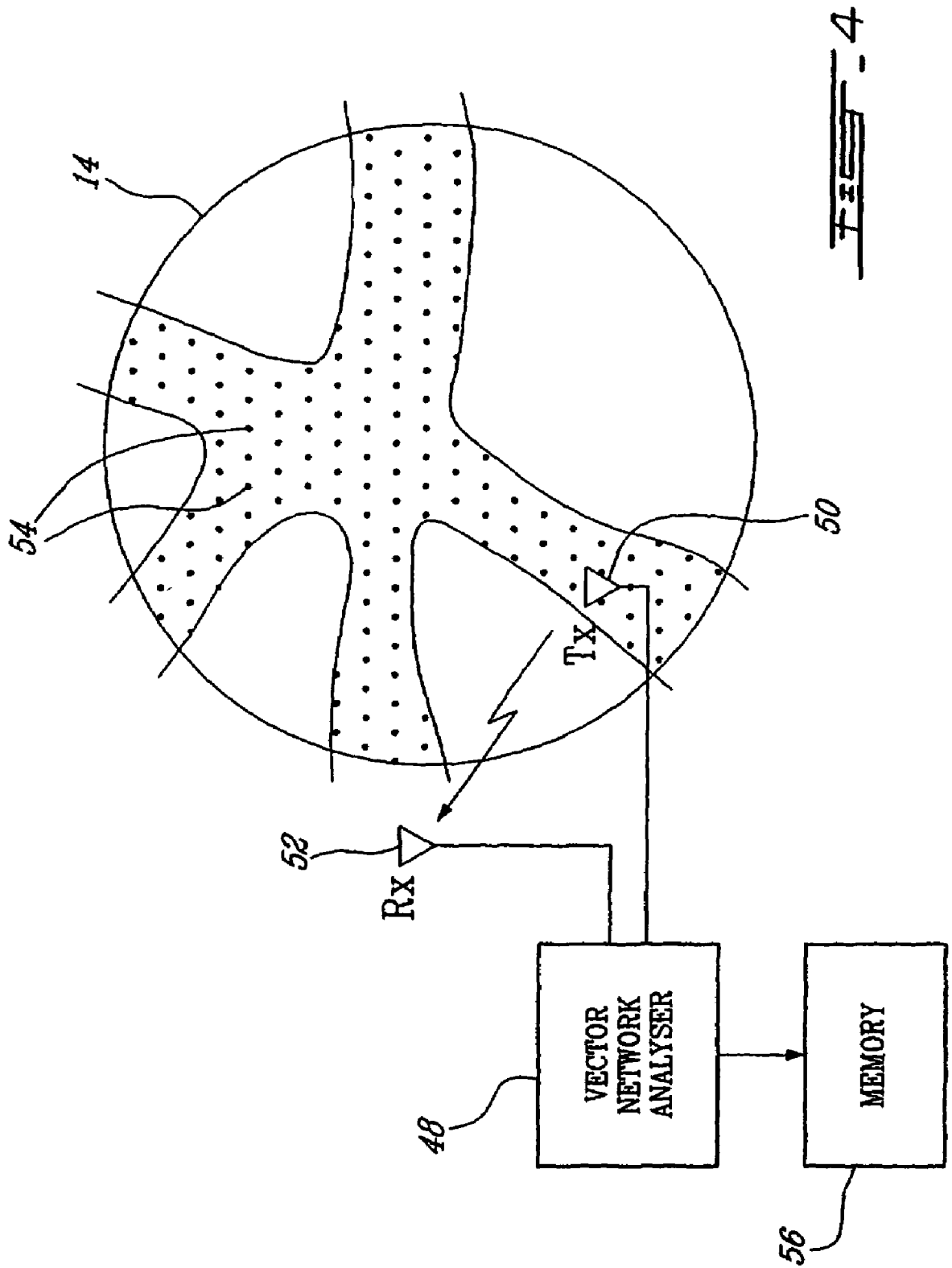
FIG. 4 is a schematic diagram of a system for gathering a training data set in accordance with an illustrative embodiment of the present invention.

Referring to FIG. 4, in order to collect a learning data set and test the developed system, a vector network analyser 48 comprising a transmitting antenna 50 and receiving antenna 52 was used. The transmitting antenna 50 was moved according to a grid 54 of predetermined positions as in 56 throughout the zone of interest 14. Illustratively, the grid 54 was comprised of predetermined positions as in 56 arranged 0.5 meters from the next column and one (1) meter from the next row. For each of the predetermined positions as in 56 the seven (7) relevant parameters $\tau_m$, $\tau_{rms}$, $\tau_{max}$, N, P, $P_1$ and $\tau_1$ of the channel's impulse response together with the location (x, y) of a transmitting antenna 50 were collected and placed in memory 52. In total 490 measurements were collected, of which 75%, or 367, were employed to train the network. As will be seen below, the remaining 25%, or 123, measurements were retained for testing the ANN 30 once trained.

During the real time phase, as a first step, the same 367 measurements were reapplied to the pattern-matching neural network to obtain the location of the mobile station and validate the memorisation property of the ANN 30. The localisation error was calculated as the difference between the measured position of the transmitter and the position estimate given by the ANN. Moreover, the Cumulative Density Function (CDF) of the location error was used as the measure of system performance.

Figure 5:
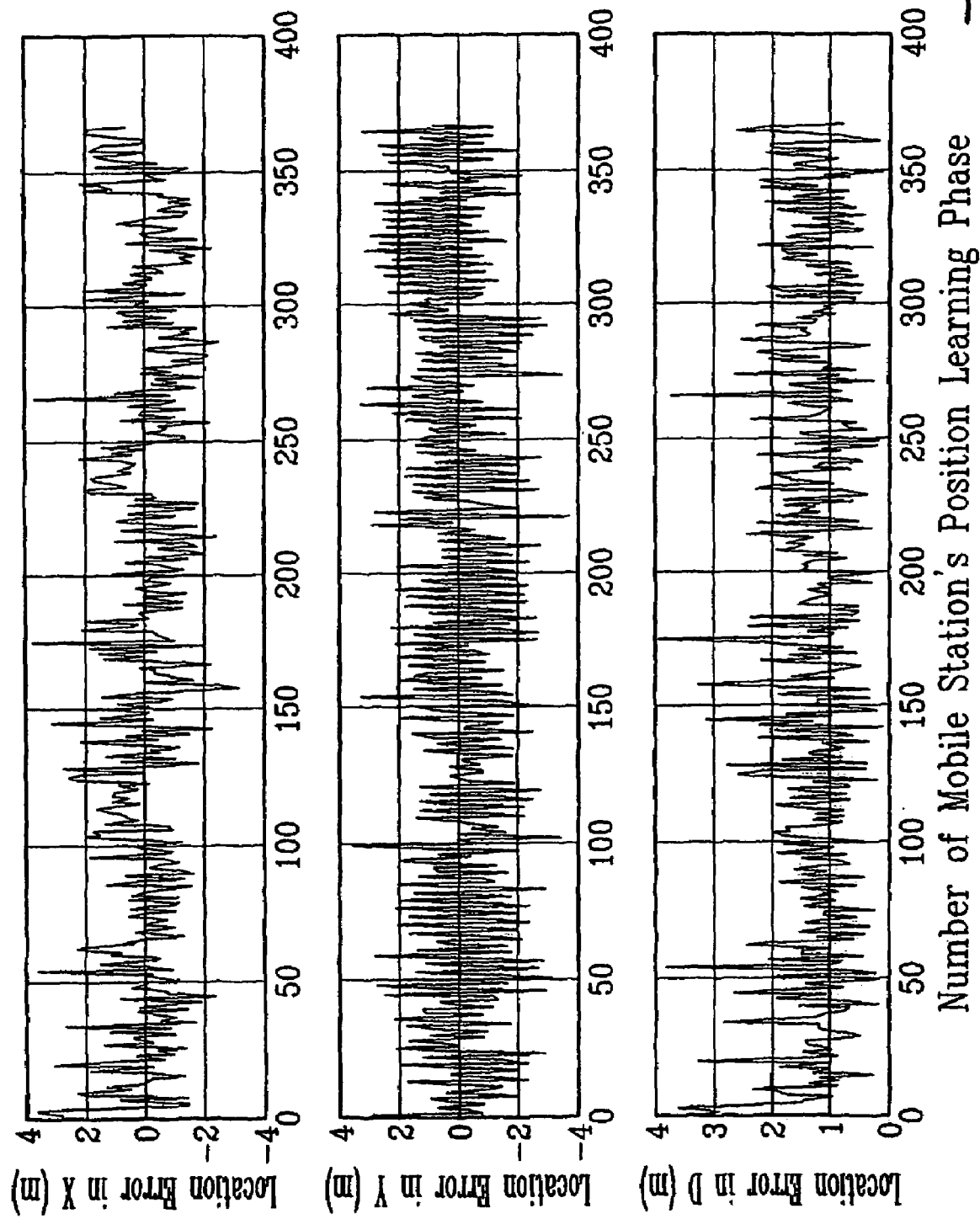
FIG. 5 provides location errors in X, Y and Euclidean distance (D) in meters with inputs corresponding to a training set of data.
Figure 6:
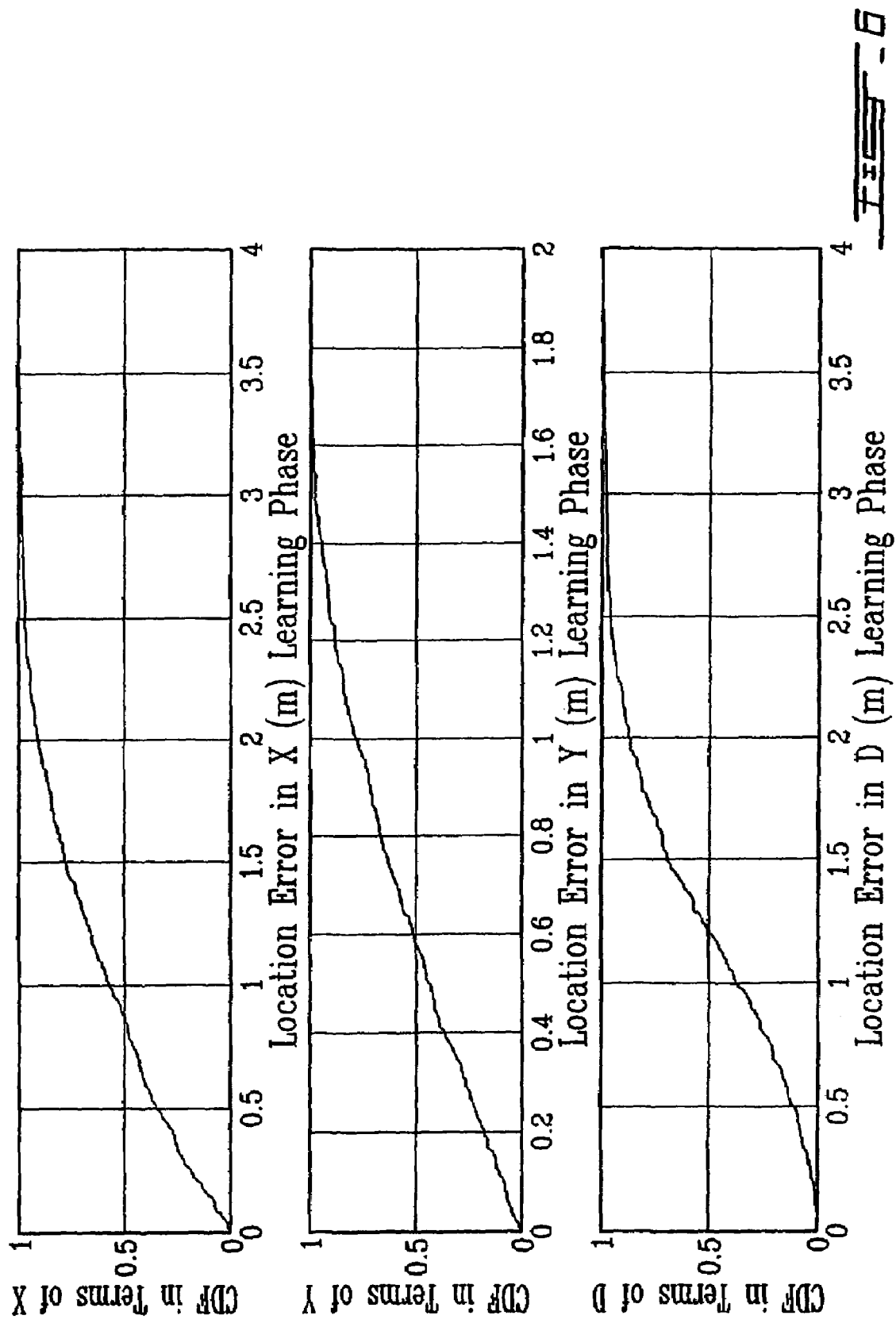
FIG. 6 provides cumulative distribution functions (CDFs) of location errors in X, Y and Euclidean distance (D) in meters of the training set of data of FIG. 5.

Referring to FIG. 5, for the training set of data it can be seen that the location error in X varies between −3.2 meters and 3.7 meters, the location error in Y varies between −1.9 meters and 1.8 meters and the maximum error in Euclidean distance D, between the estimated and the true positions, is equal to 3.9 meters. Moreover, referring to FIG. 6 it can be seen that a distance location accuracy of 2 meters is found for 90% of the trained patterns. Note however, that as discussed above an improvement of the location accuracy can be achieved but at the cost of generalisation.

At a second step, the remaining 123 non-trained patterns each comprised of the seven (7) input parameters $\tau_m$, $\tau_{rms}$, $\tau_{max}$, N, P, $P_1$ and $\tau_1$, were supplied to the inputs 42 of the ANN 30 to verify the generalisation property of the geolocation system. The estimated and true position locations, the location errors as well as their CDFs were then computed and plotted (FIGS. 7 and 8).

Figure 7:
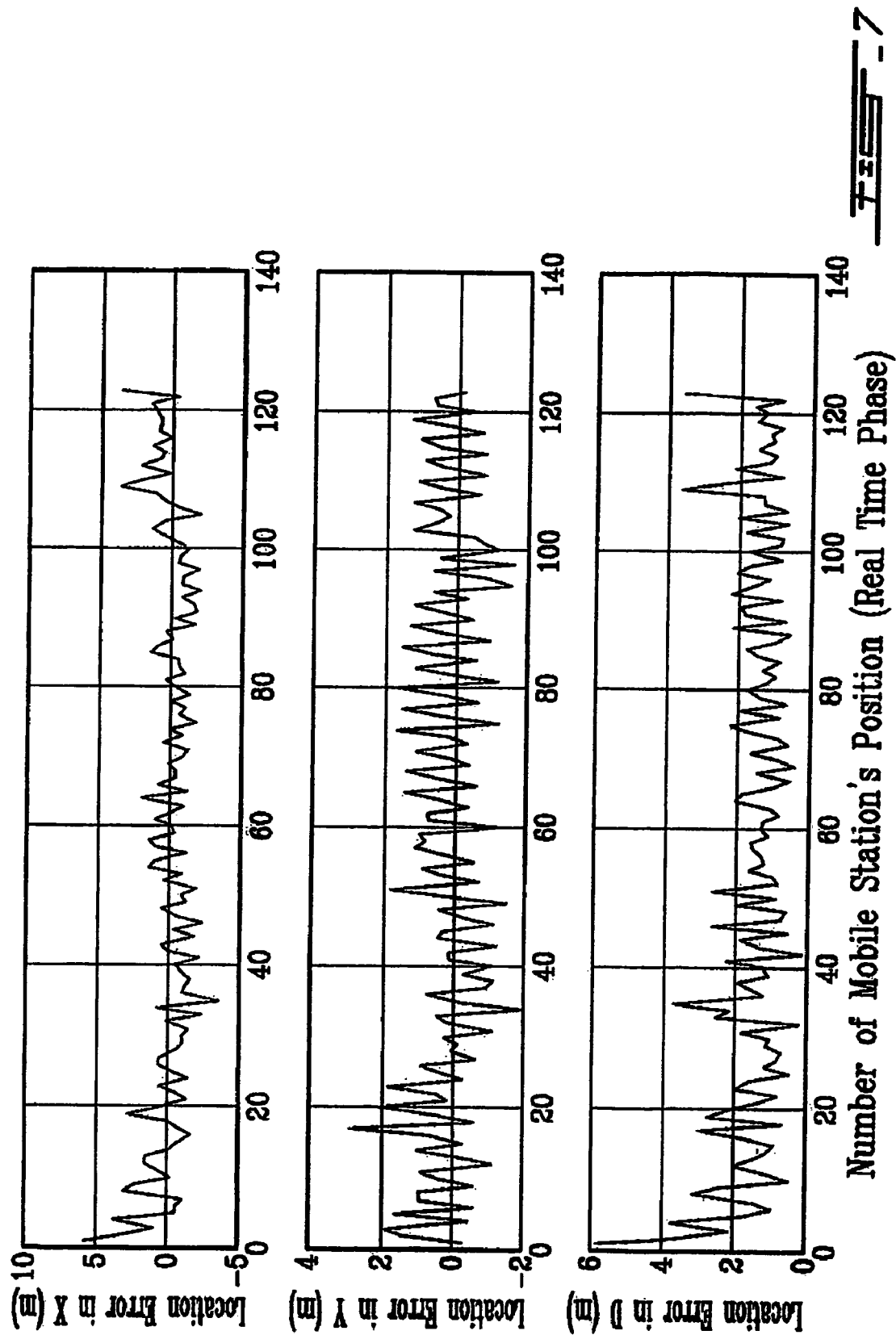
FIG. 7 provides location errors in X, Y and Euclidean distance (D) in meters with inputs corresponding to an untrained set of data.
Figure 8:
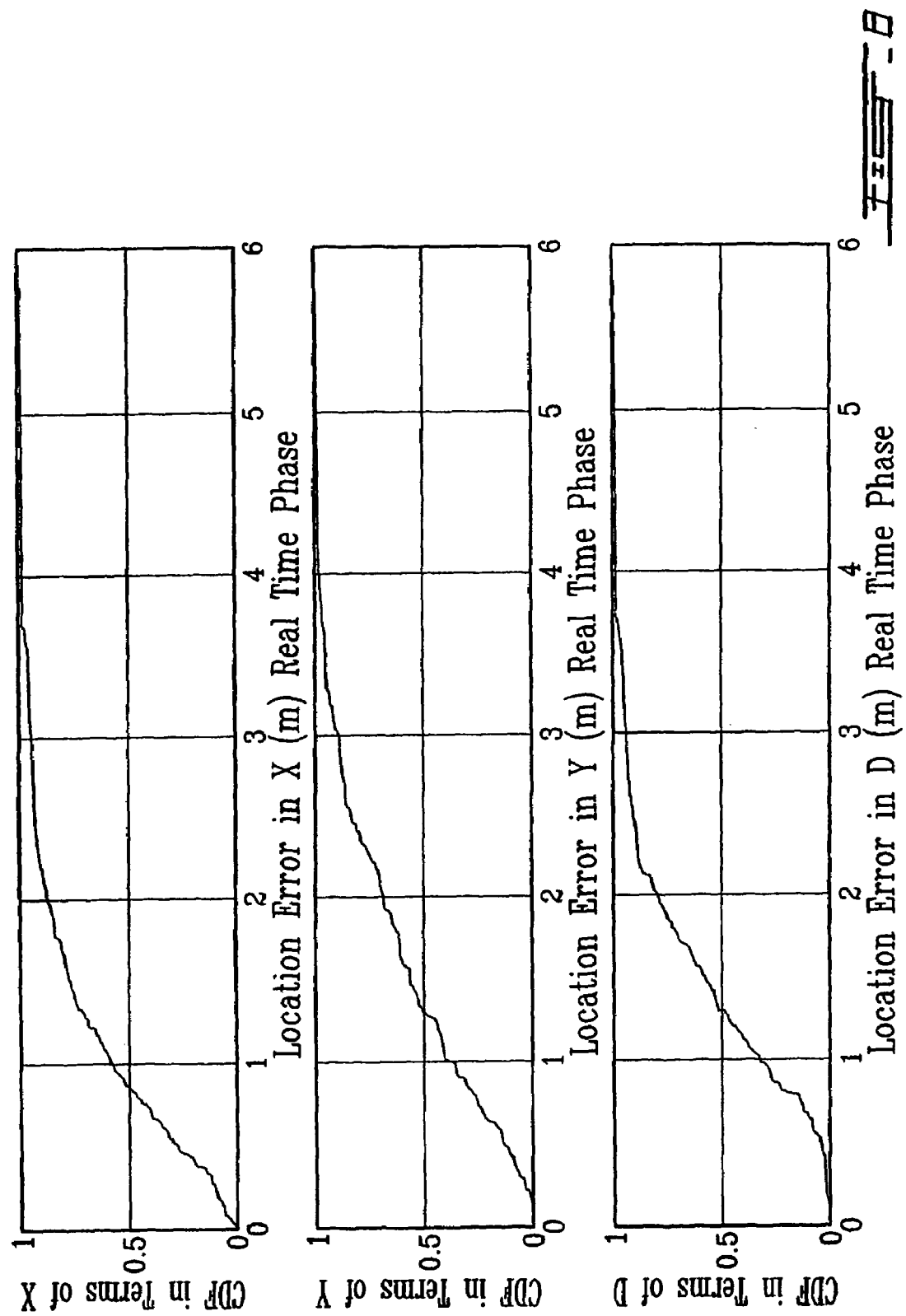
FIG. 8 provides CDFs of location errors in X, Y and Euclidean distance (D) in meters of the untrained set of data of FIG. 7.

Referring to FIG. 7, for the untrained set of data, it can be seen that the location error in X varies between −3.7 meters and 5.8 meters, the location error in Y varies between −2 meters and 2.9 meters and the maximum error in Euclidean distance D, between the estimated and the true positions, is equal to 5.8 meters.

Moreover, the accuracy of the position estimate depends on the resolution of the map, which in turn depends on the distance threshold used in the map building process. The results showed that a distance location accuracy of 2 meters has been found for 90% and 80% of the trained and untrained patterns respectively. This location accuracy, which may be improved at the cost of the generalisation property, is much smaller than the one found in the literature for indoor geolocation using fingerprinting techniques.

Figure 9:
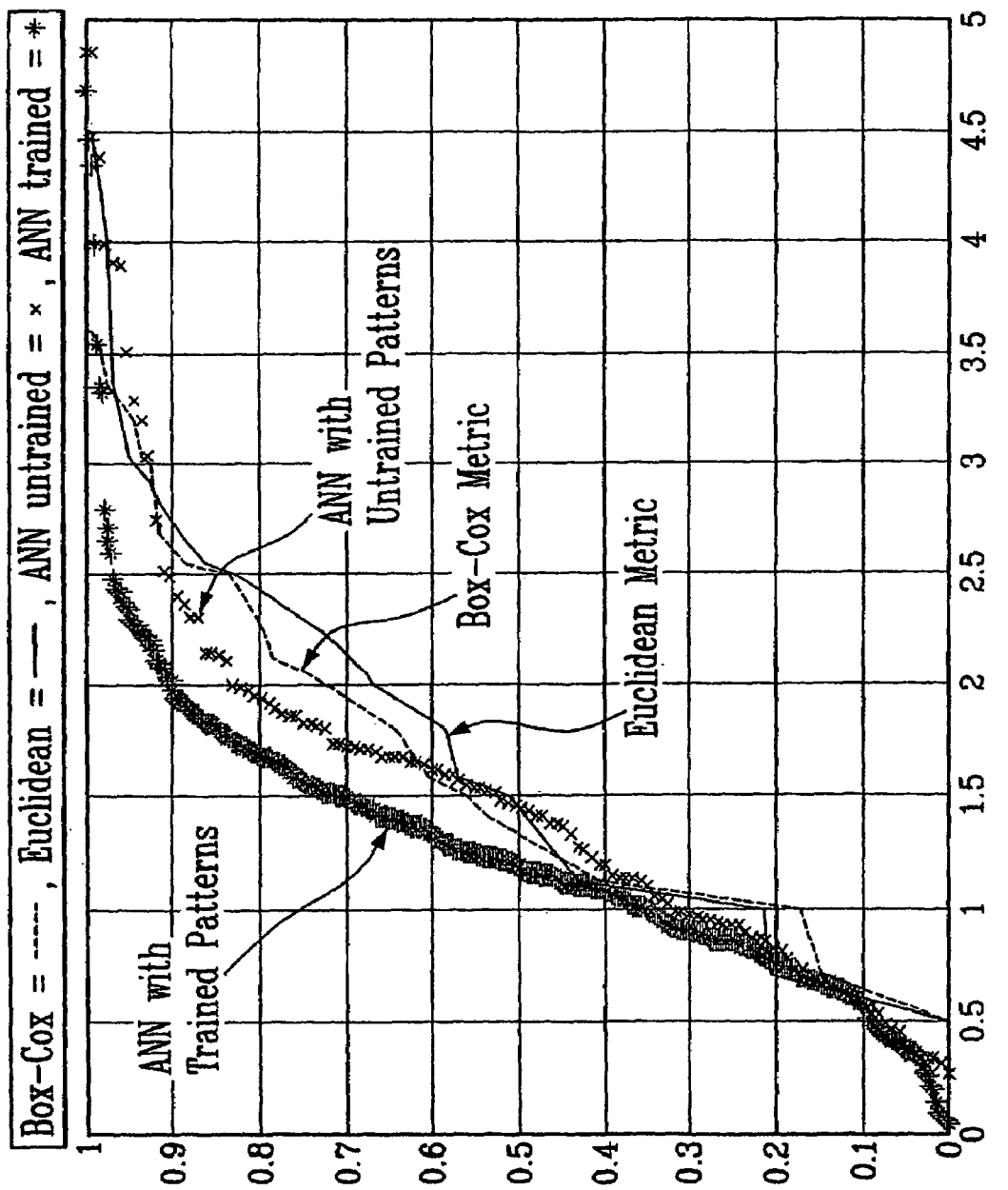
FIG. 9 provides a comparison of CDFs of location errors in Euclidean distance (D) in meters with inputs corresponding to the untrained set of data and three alternative positioning algorithms (Euclidean metric, Box-Cox metric and artificial neural network).

In order to test the ANN in an indoor geolocation system using the fingerprinting technique, versus existing methods, the results of the untrained data set were compared to the results using the nearest neighbour minimising the Euclidean distance and using the nearest neighbour minimising the Box-Cox metric. The three curves of FIG. 9 provide the CDFs of location errors in Euclidean distance D for the involved three pattern-matching algorithms. Still referring to FIG. 9, only the CDF of location errors using the ANN with the trained patterns is added on the figure since the associated curves for the two other algorithms are not necessary (their location errors tend to zero due to the memorisation of the two algorithms).

Although the present invention has been described hereinabove by way of an illustrative embodiment thereof, this embodiment can be modified at will without departing from the spirit and nature of the subject invention.

What is claimed is:

1. A system for predicting the location of a transmitter located in an indoor zone of interest, the system comprising:
   a fixed receiver for receiving a signal from the transmitter, said receiver deriving a parameterised channel impulse response from said received signal; and
   a trained neural network;
   wherein said trained neural network predicts the transmitter location from said parameterised channel impulse response.

2. The system of claim 1, wherein the transmitter is a digital mobile radio transmitter and said receiver is a digital mobile radio receiver.

3. The system of claim 2, wherein said digital mobile radio transmitter is a CDMA-DSSS transmitter and said digital mobile radio receiver is a CDMA-DSSS receiver.

4. The system of claim 2, wherein said digital mobile radio transmitter is a GSM transmitter and said digital mobile radio receiver is a GSM receiver.

5. The system of claim 2, wherein said digital mobile radio transmitter is a UMTS transmitter and said digital mobile radio receiver is a UMTS receiver.

6. The system of claim 1, wherein the transmitter is an impulse radio transmitter and said receiver is an impulse radio receiver.

7. The system of claim 6, wherein said impulse radio transmitter is a UWB transmitter and said impulse radio receiver is a UWB receiver.

8. The system of claim 1, wherein the transmitter is a WLAN transmitter and said receiver is a WLAN receiver.

9. The system of claim 1, wherein said neural network is a feed forward neural network.

10. The system of claim 1, wherein said signal is an impulse.

11. The system of claim 10, wherein said impulse has a width of less than 2 divided by the bandwidth of a channel between said transmitter and receiver.

12. The system of claim 11, wherein said impulse is transmitted repeatedly.

13. The system of claim 12, wherein said repeated transmission is less than once every 500 nanoseconds.

14. The system of claim 1, wherein said neural network comprises as many input neurons as parameters.

15. The system of claim 1, wherein said parameterised channel impulse response comprises $\tau_m$, $\tau_{rms}$, $\tau_{max}$, N, P, $P_1$ and $\tau_1$.

16. The system of claim 15, wherein said neural network comprises 7 input neurons.

17. The system of claim 1, wherein said neural network comprises ten (10) hidden layer neurons.

18. The system of claim 1, wherein said neural network comprises two (2) output neurons.

19. The system of claim 1, wherein said neural network comprises more hidden layer neurons than input neurons and output neurons.

20. The system of claim 1, wherein said neural network comprises N weights and biases and said neural network is trained using a data set comprised of less than 4*N parameterised channel impulse responses with corresponding locations.

21. The system of claim 1, wherein said neural network comprises 102 weights and biases.

22. The system of claim 1, wherein said neural network is trained using a training data set of fingerprints and corresponding locations.

23. The system of claim 22, wherein said neural network comprises a plurality of weights and biases and said weights and biases are adjusted using said training data set of fingerprints and corresponding locations.

24. The system of claim 23, wherein said weights are adjusted by minimising an error function.

25. The system of claim 24, wherein said error function is a sum of squares error function $$E_D = \frac{1}{n}\sum_{i=1}^{n}(t_i - a_i)^2$$

where $t_i$ is a corresponding location of an $i^{th}$ entry of said training data set parameterised channel impulse responses and $a_i$ is said neural network's predicted transmitter location to said $i^{th}$ entry of said training data set parameterised channel impulse responses and n is a number of parameterised channel impulse responses in said training data set.

26. The system of claim 25, wherein said sum of squares error function $E_D$ is regularised.

27. The system of claim 26, wherein said regularisation comprises adding to said sum of squares error function $E_D$ a mean of a sum of said weights and biases.

28. The system of claim 26, wherein said regularisation comprises a Bayesian regularisation in combination with a Levenberg-Marquardt algorithm.

29. The system of claim 1, wherein the indoor zone of interest is within a mine.

30. A method for training an artificial neural network for predicting a location of a transmitter in an indoor zone of interest, the network comprised of a plurality of weights and biases, the method comprising the steps of:
   collecting a training data set comprising a plurality of parameterised channel impulse responses and corresponding locations, wherein said collecting step comprises:
   a. placing a test transmitter at a new location within said zone of interest;
   b. transmitting a signal from said test transmitter to a receiver;
   c. extracting a parameterised channel impulse response from said received signal;
   d. correlating said parameterised channel impulse response with said new location; and
   e. repeating steps a), b), c) and d) throughout said zone of interest n times;
   inputting said training data set to the neural network; and
   adjusting the weights and the biases by minimising a sum of squares error function $$E_D = \frac{1}{n}\sum_{i=1}^{n}(t_i - a_i)^2$$

where $t_i$ is a corresponding location of an $i^{th}$ entry of said training data set of parameterised channel impulse responses and $a_i$ is the neural network's predicted transmitter location to said $i^{th}$ entry of said training data set parameterised channel impulse responses.

31. The method of claim 30, wherein said sum of squares error function $E_D$ is regularised.

32. The method of claim 31, wherein said regularisation comprises adding to said sum of squares error function $E_D$ a mean of a sum of said weights and biases.

33. The method of claim 32, wherein said regularisation comprises a Bayesian regularisation in combination with a Levenberg-Marquardt algorithm.

34. The method of claim 31, wherein said impulse has a width of less than 2 divided by the bandwidth of a channel between said transmitter and receiver.

35. The method of claim 30, wherein said signal is an impulse.

36. The method of claim 30, wherein said channel is a wide band channel.

37. The method of claim 30, wherein said parameterised channel impulse response comprises $\tau_m$, $\tau_{rms}$, $\tau_{max}$, N, P, $P_1$ and $\tau_1$.

38. The method of claim 30, wherein said neural network is a feed forward neural network.

39. The method of claim 30, further comprising the step, prior to said inputting step, of compressing said training data set.

40. The method of claim 39, wherein said training data compressing step comprises removing redundant data sets using partial components analysis.

41. The method of claim 30, wherein said neural network comprises 7 input neurons.

42. The method of claim 30, wherein said neural network comprises ten (10) hidden layer neurons.

43. The method of claim 30, wherein said neural network comprises two (2) output neurons.

44. The method of claim 30, wherein said neural network comprises a predetermined number of input neurons and output neurons and a number of hidden layer neurons which exceeds a sum of said input neurons and output neurons.

45. The method of claim 30, wherein said neural network comprises N weights and biases and said neural network is trained using a data set comprised of less than 4*N fingerprints with corresponding locations.

46. The method of claim 30, wherein said neural network comprises 102 weights and biases.

47. The method of claim 30, wherein the indoor zone of interest is within a mine.

48. A method for predicting the location of a transmitter in an indoor zone of interest, the method comprising:
  providing a receiver having a fixed location;
  receiving a signal transmitted from the transmitter at said receiver;
  deriving a parameterised channel impulse response from said received signal;
  supplying said parameterised channel impulse response to an input of a trained neural network; and
  reading the predicted location from an output of said neural network.

49. The method of claim 48, wherein said signal is an impulse.

50. The method of claim 49, wherein said impulse has a width of less than 2 divided by the bandwidth of a channel between said transmitter and receiver.

51. The method of claim 48, wherein said channel is a wide band channel.

52. The method of claim 48, wherein said parameterised channel impulse response comprises $\tau_m$, $\tau_{rms}$, $\tau_{max}$, N, P, $P_1$ and $\tau_1$.

53. The method of claim 46, wherein said neural network is trained according to a method, comprising:
  collecting a training data set comprising a plurality of fingerprints and corresponding locations, wherein said collecting step comprises the steps of
    a. placing a test transmitter at a new location within said zone of interest;
    b. transmitting a signal from said test transmitter to a receiver;
    c. extracting a fingerprint from said received signal;
    d. correlating said fingerprint with said new location; and
    e. repeating steps a), b), c) and d) throughout said zone of interest n times;
  inputting said training data set to the neural network; and
  adjusting the weights and the biases by minimising a sum of squares error function $$E_D = \frac{1}{n}\sum_{i=1}^{n}(t_i - a_i)^2$$

where $t_i$ is a corresponding location of an $i^{th}$ entry of said training data set of fingerprints and $a_i$ is the neural network's predicted transmitter location to said $i^{th}$ entry of said training data set fingerprints.

54. The method of claim 48, wherein the indoor zone of interest is within a mine.

55. The method of claim 48, wherein compressing includes removing redundant data sets using partial components analysis.

* * * * *

UNITED STATES PATENT AND TRADEMARK OFFICE
CERTIFICATE OF CORRECTION

PATENT NO. : 7,630,943 B2  Page 1 of 1
APPLICATION NO. : 11/389882
DATED : December 8, 2009
INVENTOR(S) : Nerguizian et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Second Day of November, 2010

David J. Kappos
*Director of the United States Patent and Trademark Office*